US008272056B2

(12) United States Patent
Sahni et al.

(10) Patent No.: US 8,272,056 B2
(45) Date of Patent: Sep. 18, 2012

(54) EFFICIENT INTRUSION DETECTION

(75) Inventors: Sartaj Kumar Sahni, Gainesville, FL (US); Xinyan Zha, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 328 days.

(21) Appl. No.: 12/678,169

(22) PCT Filed: Oct. 13, 2008

(86) PCT No.: PCT/US2008/079691
§ 371 (c)(1),
(2), (4) Date: Mar. 15, 2010

(87) PCT Pub. No.: WO2009/052039
PCT Pub. Date: Apr. 23, 2009

(65) Prior Publication Data
US 2010/0199348 A1    Aug. 5, 2010

Related U.S. Application Data

(60) Provisional application No. 60/980,254, filed on Oct. 16, 2007.

(51) Int. Cl.
*G06F 11/00* (2006.01)
(52) U.S. Cl. ............................................ 726/23
(58) Field of Classification Search .......... 726/22, 726/23, 24; 713/165, 166, 167, 188, 193
See application file for complete search history.

(56) References Cited

U.S. PATENT DOCUMENTS

| | | | |
|---|---|---|---|
| 6,769,066 B1 | 7/2004 | Botros et al. | |
| 7,725,510 B2 * | 5/2010 | Alicherry et al. | 706/48 |
| 7,756,885 B2 * | 7/2010 | Norton et al. | 707/758 |
| 7,831,606 B2 * | 11/2010 | Pandya | 707/758 |
| 7,860,712 B2 * | 12/2010 | Furodet et al. | 704/231 |
| 7,899,842 B2 * | 3/2011 | Boyce | 707/780 |
| 8,065,259 B1 * | 11/2011 | Steele et al. | 706/48 |
| 8,069,183 B2 * | 11/2011 | Boyce | 707/780 |
| 2004/0179477 A1 | 9/2004 | Lincoln et al. | |
| 2006/0020595 A1 | 1/2006 | Norton et al. | |
| 2006/0101195 A1 | 5/2006 | Jain | |
| 2007/0075878 A1 | 4/2007 | Furodet et al. | |
| 2007/0104375 A1 | 5/2007 | Furodet et al. | |
| 2007/0192286 A1 | 8/2007 | Norton et al. | |

FOREIGN PATENT DOCUMENTS

WO    WO-2006-020290    2/2006

OTHER PUBLICATIONS

Kim, M. et al., "Auto-generation of Detection Rules with Tree Induction Algorithm". Lecture Notes in Computer Science, Fuzzy Systems and Knowledge Discovery. 2005.

Li, X., "A Scalable Decision Tree System and Its Application in Pattern Recognition and Intrusion Detection". Decision Support Systems, vol. 41, 2005, 112-130.

(Continued)

*Primary Examiner* — Beemnet Dada
(74) *Attorney, Agent, or Firm* — Saliwanchik, Lloyd & Eisenschenk

(57) ABSTRACT

A method to compress an unoptimized Aho-Corasick automaton is provided that can be used in network intrusion detection systems. Embodiments of the subject method use bitmaps with multiple levels of summaries as well as aggressive path compaction. By using multiple levels of summaries, a popcount can be determined with as few as 1 addition.

31 Claims, 10 Drawing Sheets

OTHER PUBLICATIONS

Tuck, N. et al., "Deterministic Memory-Efficient String Matching Algorithms for Intrusion Detection". IEEE INFOCOM, 2004.

Xin, Z., et al., "A Boosting Approach for Intrusion Detection". Journal of Electronics (China), vol. 24, No. 3, May 2007, pp. 369-373.

Zha, X. and Sahni, S., "Highly Compressed Aho-Corasick Automata for Efficient Intrusion Detection". IEEE Symposium on Computers and Communications, 2008.

International Patent Application PCT/US2008/079691, Written Opinion of the International Searching Authority and International Search Report, completed Feb. 13, 2009.

* cited by examiner

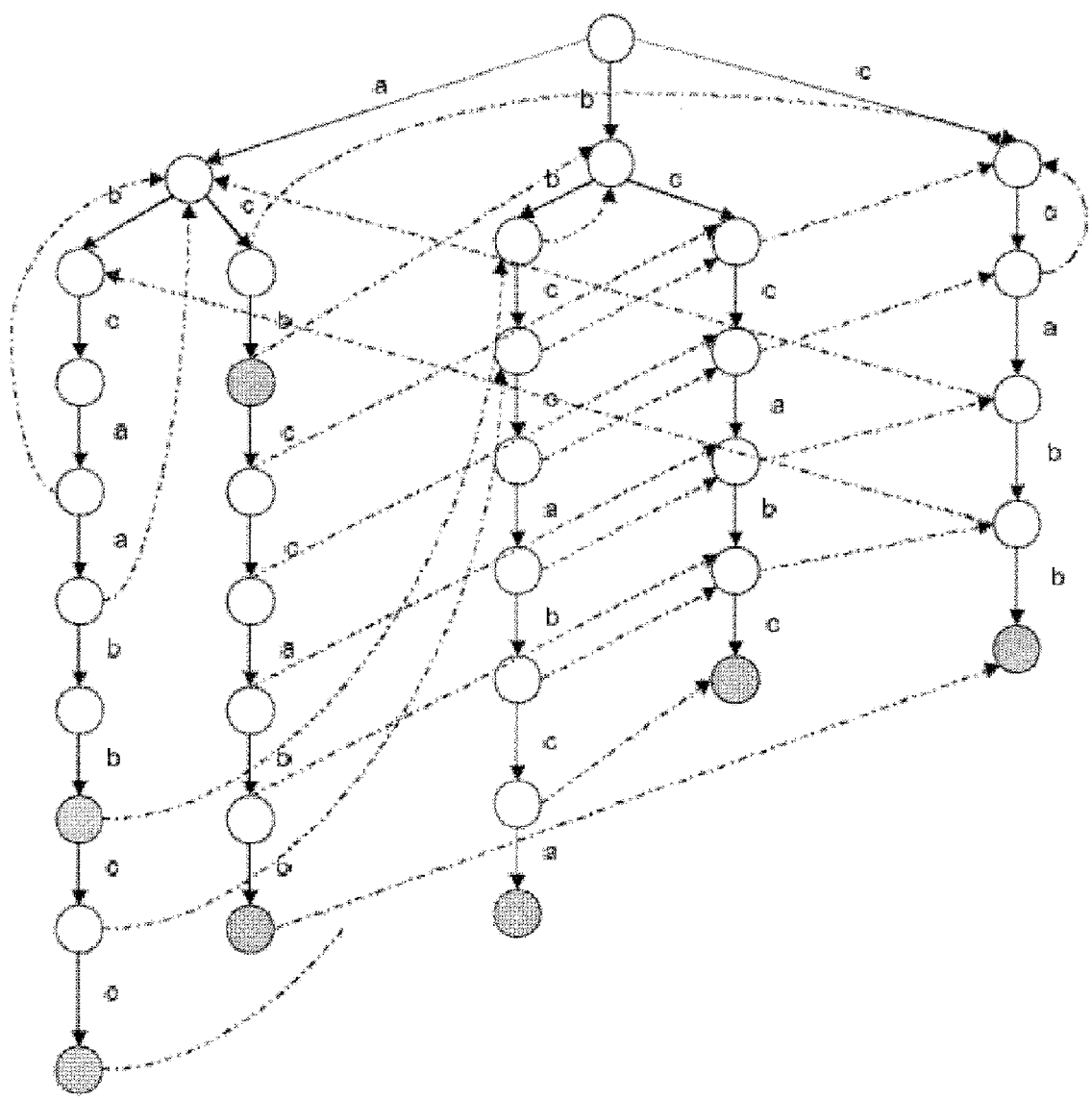
Figure 1: An example string set
Figure 2: Unoptimized Aho-Corasick automata for strings of Figure 1

Figure 3: Optimized Aho-Corasick automata for strings of Figure 1

| node type 1bit | failptr offset 3bits | L1 (S1,S2,...S7) 8bit*7=56bits | | | |
|---|---|---|---|---|---|
| bitmap 256bits | | | failure ptr 32bits | rule ptr 32bits | firstchild ptr 32bits |

| node type 1bit | capacity 3bits | firstchild ptr 32bits | char1 8bits | ruleptr 32bits | failptr 32bits | failptroff 3bits |
|---|---|---|---|---|---|---|
| ... | | | char5 8bits | rule ptr 32bits | failptr 32bits | failptroff 3bits |

Figure 5

| $i$ | in binary | $T4(i,0)$ | $T4(i,1)$ | $T4(i,2)$ | $T4(i,3)$ |
|---|---|---|---|---|---|
| 0 | 0000 | 0 | 0 | 0 | 0 |
| 1 | 0001 | 0 | 0 | 0 | 0 |
| 2 | 0010 | 0 | 0 | 0 | 1 |
| 3 | 0011 | 0 | 0 | 0 | 1 |
| 4 | 0100 | 0 | 0 | 1 | 1 |
| 5 | 0101 | 0 | 0 | 1 | 1 |
| 6 | 0110 | 0 | 0 | 1 | 2 |
| 7 | 0111 | 0 | 0 | 1 | 2 |
| 8 | 1000 | 0 | 1 | 1 | 1 |
| 9 | 1001 | 0 | 1 | 1 | 1 |
| 10 | 1010 | 0 | 1 | 1 | 2 |
| 11 | 1011 | 0 | 1 | 1 | 2 |
| 12 | 1100 | 0 | 1 | 2 | 2 |
| 13 | 1101 | 0 | 1 | 2 | 2 |
| 14 | 1110 | 0 | 1 | 2 | 3 |
| 15 | 1110 | 0 | 1 | 2 | 3 |

Figure 6: Lookup table for 4-bit blocks

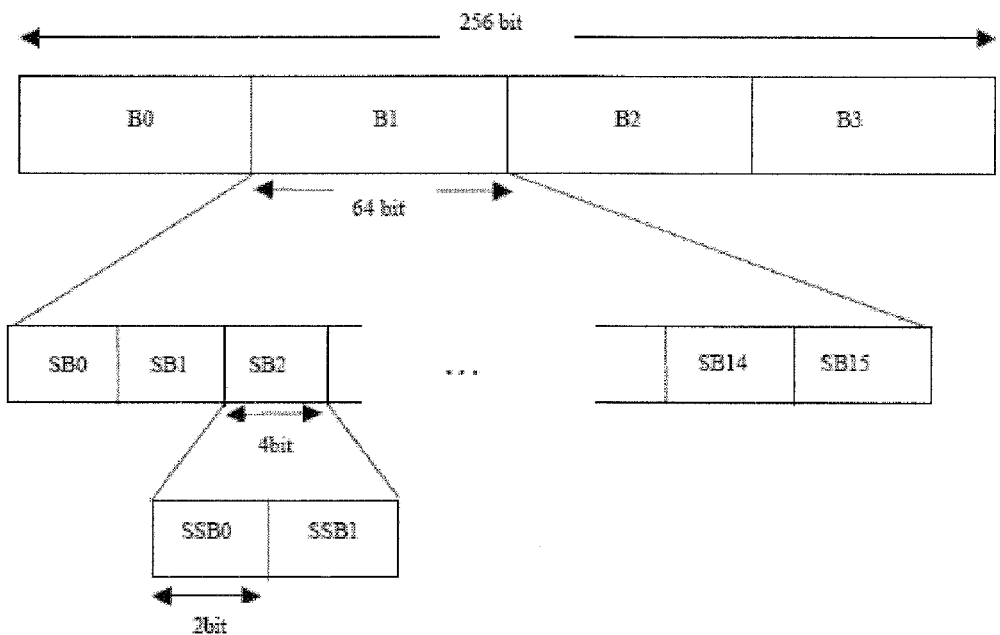
Figure 7: Type I summaries
| degree | number of nodes | percentage |
|---|---|---|
| 0 | 1964 | 7.75 |
| 1 | 22453 | 88.6 |
| 2 | 591 | 2.33 |
| 3 | 149 | 0.58 |
| 4 | 43 | 0.17 |
| 5 | 35 | 0.14 |
| 6 | 14 | 0.055 |
| 7 | 23 | 0.090 |
| 8 | 14 | 0.055 |
| 9 | 8 | 0.031 |
| 10 | 6 | < 0.03 |
| 11 | 3 | < 0.03 |
| 12 | 4 | < 0.03 |
| 13 | 5 | < 0.03 |
| 14 | 3 | < 0.03 |
| 15 | 2 | < 0.03 |
| 17,18,21,51,78 | 1 | < 0.03 |
Figure 8: Distribution of states in a 3000 string Snort database

| node type 3bits | firstchild type 3bits | L1(B0,...,B2) 8bit*3=24bits | L2(SB0,...SB14) 6bit*4*15=360bits | L3(SSB0) 2bit*16*4*1=128bits | | |
|---|---|---|---|---|---|---|
| failptroff 8bits | 256 bits bitmap | | | failure ptr 32bits | rule ptr 32bits | firstchild ptr 32bits |

Figure 9

| node type 3bits | firstchild type 3bits | failptroff 8bits | char1 8bits | ... | char8 8bits | size 3bits | failptr 32bits | rule ptr 32bits | firstchild ptr 32bits |
|---|---|---|---|---|---|---|---|---|---|

Figure 10

| node type 3bits | firstchild type 3bits | firstchild ptr 32bits | char1 8bits | ruleptr 32bits | failptr 32bits | failptroff 8bits |
|---|---|---|---|---|---|---|
| capacity 8bits | ... | | charc 8bits | rule ptr 32bits | failptr 32bits | failptroff 8bits |

Figure 11

|  | $W=32$ | | $W=64$ | |
| --- | --- | --- | --- | --- |
|  | match | mismatch | match | mismatch |
| $B$ (Type I) | 4 to 7 | 4 | 3 to 6 | 3 |
| $B$ (Type II) | 4 to 6 | 4 | 3 to 5 | 3 |
| $B$ (Type III) | 4 to 5 | 4 | 3 to 4 | 3 |
| $L$ | 3 to 5 | 3 to 5 | 2 to 3 | 2 to 3 |
| $O1$ | 3 | 3 | 2 | 2 |
| $O2$ | 4 | 3 or 5 | 2 | 2 or 3 |
| $O3$ | 6 | 3, 5, or 6 | 3 | 2 or 3 |
| $O4$ | 7 | 3 or 5 to 7 | 4 | 2 to 4 |
| $O5$ | 8 | 3, 5, 6, 8, or 9 | 4 | 2, 3 to 5 |
| $O$ | 3 or $\lceil\frac{2+5i}{4}\rceil+1$ | 3 or $\lceil\frac{2+5i}{4}\rceil+2$ | 2 or $\lceil\frac{2+5i}{8}\rceil+1$ | 2 or $\lceil\frac{2+5i}{8}\rceil+1$ |
| $TB$ Tuck et al. | 4 to 5 | 4 | 3 | 3 |
| $TO$ Tuck et al. | $1+i$, 6, or 8 | 3 or $3+i$ | $1+i$ or 7 | $2+\lceil\frac{i}{2}\rceil$ or 4 |

Figure 12: Memory accesses to process a node

|  | $W=128$ | | $W=1024$ | |
| --- | --- | --- | --- | --- |
|  | match | mismatch | match | mismatch |
| $B$ (Type I) | 2 to 5 | 2 | 1 | 1 |
| $B$ (Type II) | 2 to 4 | 2 | 1 | 1 |
| $B$ (Type III) | 2 to 3 | 2 | 1 | 1 |
| $L$ | 1 to 2 | 1 to 2 | 1 | 1 |
| $O1$ | 1 | 1 | 1 | 1 |
| $O2$ | 1 | 2 | 1 | 1 |
| $O3$ | 2 | 2 | 1 | 1 |
| $O4$ | 2 | 2 | 1 | 1 |
| $O5$ | 2 | 2 or 3 | 1 | 1 |
| $O$ | 1 or $\lceil\frac{2+5i}{16}\rceil+1$ | 1 or $\lceil\frac{2+5i}{16}\rceil+1$ | $1(c\leq 12)$, $\lceil\frac{2+5i}{128}\rceil+1(c>12)$ | $1(c\leq 12)$, $\lceil\frac{2+5i}{128}\rceil+1(c>12)$ |
| $TB$ Tuck et al. | 2 | 3 | 1 | 1 |
| $TO$ Tuck et al. | 2 | 2 | 1 | 1 |

Figure 13: Memory accesses to process a node

| Node Type | $B$ | $L$ | $Ol$ | $O$ | $TB$ | $TO$ |
|---|---|---|---|---|---|---|
| DataSet 1284 | 133 | 595 | 850 | 454 | 1057 | 2955 |
| DataSet 2430 | 100 | 769 | 938 | 576 | 1527 | 3310 |

Figure 14: Number of nodes of each type

| Methods | Tuck | Type I | Type II | Type III |
|---|---|---|---|---|
| Memory(bytes) | 208624 | 157549 | 155421* | 151032* |
| Normalized | 1 | 0.76 | 0.75 | 0.72 |

*Excludes memory for $T4$ and $T16$

Figure 15: Memory requirement for data set 1284

| Data set 2430 | | | | |
|---|---|---|---|---|
| Methods | Tuck | Type I | Type II | Type III |
| Memory(bytes) | 251524 | 177061 | 175461* | 172161* |
| Normalized | 1 | 0.70 | 0.70 | 0.68 |

*Excludes memory for $T4$ and $T16$

Figure 16: Memory requirement for data set 2430

| Methods | Tuck | Type I | Type II | Type III |
|---|---|---|---|---|
| strlen=1002832 | 10.61M | 1.37M | 1.25M | 0.76M |
| strlen=2032131 | 32.21M | 4.15M | 3.79M | 2.29M |
| strlen=3002665 | 64.26M | 8.25M | 7.51M | 4.55M |
| strlen=4006579 | 107.21M | 13.74M | 12.49M | 7.56M |
| strlen=5035666 | 161.76M | 20.75M | 18.82M | 11.37M |
| Normalized | 1 | 0.128 | 0.117 | 0.071 |

Figure 18: Number of popcount additions, data set 1284

| Methods | Tuck | Type I | Type II | Type III |
|---|---|---|---|---|
| strlen=1002832 | 11.54M | 1.46M | 1.33M | 0.79M |
| strlen=2032131 | 34.97M | 4.43M | 4.02M | 2.42M |
| strlen=3002665 | 69.54M | 8.78M | 7.96M | 4.80M |
| strlen=4006579 | 116.11M | 14.67M | 13.28M | 8.00M |
| strlen=5035666 | 175.60M | 22.25M | 20.09M | 12.08M |
| Normalized | 1 | 0.127 | 0.114 | 0.069 |

Figure 19: Number of popcount additions, data set 2430

| Methods | $W=32$ | $W=64$ | $W=128$ | $W=1024$ |
|---|---|---|---|---|
| Tuck et al. | 1 | 1 | 1 | 1 |
| Type I | 1.108 | 1.241 | 1.136 | 1.004 |
| Type II | 1.069 | 1.184 | 1.064 | 1.004 |
| Type III | 1.007 | 1.093 | 0.977 | 1.004 |

Figure 21: Normalized memory accesses to process a query string, data set 1284

| Methods | $W=32$ | $W=64$ | $W=128$ | $W=1024$ |
|---|---|---|---|---|
| Tuck et al. | 1 | 1 | 1 | 1 |
| Type I | 1.111 | 1.245 | 1.155 | 1.001 |
| Type II | 1.072 | 1.188 | 1.084 | 1.001 |
| Type III | 1.010 | 1.095 | 0.980 | 1.001 |

Figure 22: Normalized memory accesses to process a query string, data set 2430

EFFICIENT INTRUSION DETECTION

CROSS REFERENCE TO RELATED APPLICATION

This application is the U.S. national stage application of International Patent Application No. PCT/US2008/079691, filed Oct. 13, 2008, which claims the benefit of U.S. Provisional Application Ser. No, 60/980,254, filed Oct. 16, 2007, and which are hereby incorporated by reference herein in their entirety, including any figures, tables, or drawings.

GOVERNMENT SUPPORT

The subject invention was made with government support under a research project supported by NSF ITR under grant number ITR-0326155 via a subcontract from the University of Connecticut. The government has certain rights in the invention.

BACKGROUND OF INVENTION

Intrusion detection systems (IDS) monitor events within a network or computer system with the objective of detecting unwanted manipulations, or intrusions, of computer systems defined by the National. Institute of Standards and Technology in their Special Publication on IDSs as "attempts to compromise the confidentiality, integrity, availability, or to bypass the security mechanisms of a computer or network." The intrusion detected by an IDS may manifest itself as, for example, a denial of service, unauthorized login, a user performing tasks that he/she is not authorized to do (e.g., access secure files, create new accounts, etc), or execution of malware such as viruses and worms.

Intrusion detection is the process of monitoring the events occurring in a computing system or network and analyzing them for signs of possible incidents, which are violations or imminent threats of violation of computer security policies, acceptable use policies, or standard security practices. Although many incidents are malicious in nature, many others are not; for example, a person might mistype the address of a computer and accidentally attempt to connect to a different system without authorization.

An IDS typically takes the form of software or hardware products that automate the intrusion detection process. An IDS accomplishes its objective by analyzing data gathered from the network, host computer, or application that is being monitored. The analysis usually takes one of two forms— misuse (or signature) detection and anomaly detection. In misuse detection, the IDS maintains a database of signatures (patterns of events) that correspond to known attacks and searches the gathered data for these signatures. In anomaly detection the IDS maintains statistics that describe normal usage and checks for deviations from these statistics in the monitored data. While misuse detection usually has a low rate of false positives, it is able to detect only known attacks. Anomaly detection usually has a higher rate of false positives (because users keep changing their usage pattern thereby invalidating the stored statistics) but is able to detect new attacks never seen before.

Several types of IDSs are available commercially, such as, for example, network, host, application, protocol, and hybrid IDSs. Network intrusion detection systems (NIDS) examine network traffic (both in- and out-bound packets) looking for traffic patterns that indicate attempts to break into a target computer, port scans, denial of service attacks, and other malicious behavior. Host intrusion detection systems (HIDS) monitor the activity within a computing system looking for activity that violates the computing systems internal security policy (e.g., a program attempting to access an unauthorized resource). Application intrusion detection systems (AIDS) monitor the activity of a specific application while protocol intrusion detection systems (PIDS) ensure that specific protocols such as HTTP behave as they should. Each type of IDS has its capabilities and limitations and attempts have been made to put together hybrid IDSs that combine the capabilities of the described base IDSs.

The development of high-speed intrusion detection systems and components has been the focus of significant recent research. Although there are many components in a NIDS that should be optimized to achieve line-rate processing, the string matching component, which is one of the most time consuming components, has been the focus of much of the prior work on NIDS optimization. String matching requires the examination of the network traffic to determine all matches with the strings in the string database. Although pre-filtering reduces the effective workload on the NIDS, there remains a need for powerful and compact data structures for string matching.

Bro, lead by Vern Paxson, and Snort, lead by Martin Roesch, are two of the more popular public-domain NIDSs that incorporate pre-filtering. Both are software solutions to intrusion detection. In addition, both maintain a database of signatures (or rules) that include a string as a component. These intrusion detection systems examine the payload of each packet that is matched by a rule and reports all occurrences of the string associated with that rule. It is estimated that about 70% of the time it takes Snort, for example, to process packets is spent in its string matching code and this code accounts for about 80% of the instructions executed (see Anonatos et al., "Generating realistic workloads for network intrusion detection systems," *ACM Workshop on Software and Performance*, 2004). Consequently, much research has been done recently to improve the efficiency of string matching.

The current implementation of Snort uses an optimized version of the Aho-Corasick automaton provided by A. Aho and M. Corasick in "Efficient string matching: An aid to bibliographic search," *CACM*, 18, 6, 1975, 333-340, which is hereby incorporated by reference in its entirety. Snort also uses SFK search, which is the algorithm used for low memory situations, and the Wu-Manber multi-string search algorithm, which is described in "Agrep—a fast algorithm for multi-pattern searching," *Technical Report*, Department of Computer Science, University of Arizona (1994) by S. Wu and U. Manber.

The memory required to store the optimized Aho-Corasick and Wu-Manber data structures can be excessive. To reduce the memory requirement of the Aho-Corasick automaton, Tuck et al., in "Deterministic memory efficient string matching algorithms for intrusion detection," *INFOCOM* (2004), have proposed starting with the unoptimized Aho-Corasick automaton and using bitmaps and path compression. With these compression methods, Tuck et al. found that the memory required by the compressed unoptimized Aho-Corasick automaton becomes about $1/50$ to $1/30$ of that required by the optimized automaton and the Wu-Manber structure and is slightly less than that required by SFK search. However, a search requires a large number of additions to be performed at each node and so requires hardware support for efficient implementation. String matching using a purely software implementation of the bitmap and path-compressed Aho-Corasick automaton takes about 10% to 20% more time, on average, than when an optimized Aho-Corasick automaton is used. Hardware and hardware assisted solutions also have been proposed involving the use of TCAMs (ternary content addressable memories) and/or FPGAs (field programmable gate arrays).

The Aho-Corasick automaton for multi-string matching is widely used in IDSs. The method of Aho-Corasick involves constructing a state machine for pattern matching and then using the pattern matching state machine to process a text string in a single pass. There are two versions of this automaton—unoptimized and optimized. While both versions are finite state machines, the unoptimized version has a failure pointer for each state, while in the optimized version no state has a failure pointer. In both versions, each state has success pointers and each success pointer has a label, which is a character from the string alphabet, associated with it. Also, each state has a list of strings/rules (from the string database) that are matched when that state is reached by following a success pointer. This is the list of matched rules. In the unoptimized version, the search starts with the automaton start state designated as the current state and the first character in the text string, S, that is being searched designated as the current character. At each step, a state transition is made by examining the current character of S. If the current state has a success pointer labeled by the current character, a transition to the state pointed at by this success pointer is made and the next character of S becomes the current character. When there is no corresponding success pointer, a transition to the state pointed at by the failure pointer is made and the current character is not changed. Whenever a state is reached by following a success pointer, the rules in the list of matched rules for the reached state are output along with the position in S of the current character. This output is sufficient to identify all occurrences, in S, of all database strings. Aho and Corasick have shown in their paper entitled "Efficient string matching: An aid to bibliographic search," that when their unoptimized automaton is used, the number of state transitions is 2n, where n is the length of S.

In the optimized version, each state has a success pointer for every character in the alphabet and so, there is no failure pointer. Aho and Corasick show how to compute the success pointer for pairs of states and characters for which there is no success pointer in the unoptimized automaton thereby transforming an unoptimized automaton into an optimized one. The number of state transitions made by an optimized automaton when searching for matches in a string of length n is n.

FIG. 1 shows an example string set drawn from the 3-letter alphabet {a, b, c}. FIG. 2 shows its unoptimized Aho-Corasick automaton, and FIG. 3 shows its optimized Aho-Corasick automaton. For this example, it can be assumed that the string alphabet is {A, B, C}.

When the failure pointers are removed from an uncompressed Aho-Corasick automaton, the resulting structure is a trie rooted at the automaton start node. However, an optimized automaton has the structure of a graph that may not be a trie. This difference in the structure defined by the success pointers has an impact on the ability to compress unoptimized automata versus optimized automata.

Tuck et al. provide a method to compress non-optimized automaton. To understand their method, an example is provided assuming that the alphabet size is 256 (e.g., ASCII characters). Although the development is generalized readily to any alphabet size, it is convenient to do the development using a fixed and realistic alphabet size. A natural way to store the Aho-Corasick automaton, for a given database D of strings, in a computer is to represent each state of the unoptimized automaton by a node that has the following fields:

1. Success[0:255], where Success[i] gives the state to transition to when the ASCII code for the current character is i (Success[i] is null in case there is no success pointer for the current state when the current character is i).
2. RuleList: a list of rules that are matched when this state is reached via a success pointer.
3. Failure: the transition to make when there is no success transition, for the current character, from the current state.

For this example, assume that each pointer requires 4 bytes. So, each node requires 1024 bytes for the Success array and 4 bytes for the failure pointer. In keeping with Tuck et al., when accounting for the memory required for RuleList, it can be assumed that only a 4-byte pointer to this list is stored in the node and the memory required by the list itself can be ignored. Hence, the size of a state node for an unoptimized automaton is 1032 bytes. In the optimized version, the Failure field is omitted and the memory required by a node is 1028 bytes. While each node of the optimized automaton requires 4 bytes less than required by each node of the unoptimized automaton, there is little opportunity to compress an optimized node as each of its 256 success pointers is non-null and the automaton does not have a tree structure. However, many of the success pointers in the nodes of an unoptimized automaton are null and the structure defined by the success pointers is a trie. Therefore, there is an opportunity to compress these nodes. Following up on this observation, Tuck et al. proposed two transformations, bitmap compression and path compression, to compress the nodes in an unoptimized automaton:

1. Bitmap Compression. In its simplest form, bitmap compression replaces each 1032-byte node of an unoptimized automaton with a 44-byte node. Of these 44 bytes, 8 are used for the failure and rule list pointers. Another 32 bytes are used to maintain a 256-bit bitmap with the property that bit i of this map is 1 if and only if Success[i]≠null. The nodes corresponding to the non-null success pointers are stored in contiguous memory and a pointer (firstChild) to the first of these stored in the 44-byte node. To make a state transition when the ASCII code for the current character is i, it is first determined whether Success[i] is null by examining bit i of the map. In case this bit is null, the failure pointer is used. When this bit is not null, the number of bits (popcount or rank) in bitmap positions less than i that are 1 is determined, and then using this count, the size of a node (44-bytes), and the value of the first child pointer, the location of the node to transition to is determined. Since determining the popcount involves examining up to 255 bits, this operation is quite expensive (at least in software). To reduce the cost of determining the popcount, Tuck et al. propose the use of summaries that give the popcount for the first 32*j, 1≤j<8 bits of the bitmap. Using these summaries the popcount for any i may be determined by adding together a summary popcount and up to 31 bit values. Each summary needs to be 8 bits long (the maximum value is 255) and 7 summaries are needed. The size of a bit compressed node with summaries is, therefore, 51 bytes. FIG. 4 shows a bitmap node. As shown in FIG. 4, the size of a bitmap node becomes 52 bytes when the node type and failure pointer offset fields that are needed to support path compression are included.

2. Path Compression. Path compression is similar to end-node optimization (see Eatherton et al., "Tree bitmap: hardware/software IP lookups with incremental updates," *Computer Communication Review*, 34(2): 97-122, 2004 and W. Lu and S. Sahni, "Succinct representation of static packet classifiers," *IEEE Symposium on Computers and Communications*, 2007). An end-node sequence is a sequence of states at the bottom of the automaton (the start state is at the top of the automaton) that are comprised of states that have a single non-null success transition (except the last state in the sequence, which has no non-null success transition). States in the same end-node sequence are packed together into one or more path compressed nodes. The number of these states that may be packed into a compressed node is limited by the capacity of a path compressed node. So, for example, if there is an end-node sequence $s_1, s_2, \ldots, s_6$ and if the capacity of a path compressed node is 4 states, then $s_1, \ldots, s_4$ are packed into one node (for example A) and $s_5$ and $s_6$ into another (for example B). For each $s_i$ packed into a path compressed node in this way, the 1-byte character for the transition plus the failure and rule list pointers for $s_i$ need to be stored. Since several automaton states are packed into a single compressed node, a 4-byte failure pointer that points to a compressed node is not sufficient. In addition, an offset value is needed that indicates which state within the compressed node to be transitioned to. Using 3 bits for the offset, nodes with capacity $c \leq 8$ can be handled. Note that now, $\lceil 3c/8 \rceil$ bytes are needed for the offsets. Hence, a path compressed node whose capacity is $c \leq 8$ needs $9c + \lceil 3c/8 \rceil$ bytes for the state information. Another 4 bytes are needed for a pointer to the next node (if any) in the sequence of path compressed nodes (i.e., a pointer from A to B). An additional byte is required to identify the node type (bitmap and compressed) and the size (number of states packed into this compressed node). So, the size of a compressed node is $9c + \lceil 3c/8 \rceil + 5$ bytes. Accordingly, the node type bit and an offset for the failure pointer are now required in the bitmap nodes. Accounting for these fields, the size of a bitmap node becomes 52 bytes. Since a compressed node may be a sibling (states/nodes reachable by following a single success pointer from any given state/node are siblings) of a bitmap node, the sizes of both bitmap and path compressed nodes need to be kept the same so that the $j^{th}$ child of a bitmap node can be easily accessed by performing arithmetic on the first child pointer. This requirement creates a limitation of c=5 and a path compressed node size that is 52 bytes. FIG. 5 shows a path compressed node.

On the 1533-string Snort database of 2003, the memory required by the bitmapped-path compressed automaton using one level of summaries is about 1/50 that required by the optimized automaton, about 1/27 that required by the Wu-Manber data structure, and about 10% less than that required by the SFK search data structure. However, the average search time, using a software implementation, is increased by between 10% and 20% relative to that for the optimized automaton, by between 30% and 100% relative to the Wu-Manber algorithm, and is about the same as for SFK search. According to Tuck et al., the real payoff from the Aho-Corasick automaton comes with respect to worst-case search time. The worst-case search time using the Aho-Corasick automaton is between 1/4 and 1/3 that when the Wu-Manber or SFK search algorithms are used. The worst-case search time for the bitmapped-path compressed unoptimized automaton is between 50% and 100% more than for the optimized automaton.

Accordingly, there continues to be a need in the art for improvements to the storage and search cost of NIDS string matching using the Aho-Corasick automaton.

BRIEF SUMMARY

The present invention provides methods and structures for efficient intrusion detection systems. According to certain embodiments of the present invention, the storage and search cost of NIDS string matching using Aho-Corasick automata are improved.

In one embodiment of the present invention, an uncompressed Aho-Corasick automaton is compressed using large memory blocks of different lengths and popcount computation is accomplished using multiple levels of summaries. Three types of summaries are provided. In the first type, three levels of summaries are used with no table. In the second type, three levels of summaries are used in which the third level is a table. In the third type, two levels of summaries are used in which the second level is a table.

The memory blocks according to the present invention include a bitmap node, a low degree node, and a path compressed node. The bitmap node can include any of the three types of summaries. The low degree nodes can be used for states that have between two and eight success transitions. The path compressed node includes variable-sized paths, and path compression is not limited to end node sequences.

BRIEF DESCRIPTION OF DRAWINGS

FIG. 1 shows an example string set.

FIG. 2 shows an unoptimized Aho-Corasick automata for strings of FIG. 1.

FIG. 3 shows an optimized Aho-Corasick automata for strings of FIG. 1.

FIG. 5 shows a path compressed node according to Tuck et al.

FIG. 6 shows a lookup table for 4-bit blocks.

FIG. 7 shows Type I summaries according to an embodiment of the present invention.

FIG. 8 shows distribution of states in a 3000 string Snort database.

FIG. 9 shows a bitmap node according to an embodiment of the present invention.

FIG. 10 shows a low degree node according to an embodiment of the present invention.

FIG. 11 shows a path compressed node according to an embodiment of the present invention.

FIG. 12 shows a table illustrating memory accesses to produce a node with W=32 and 64.

FIG. 13 shows a table illustrating memory accesses to produce a node with W=128 and 1024.

FIG. 14 shows the number of nodes of each type according to an embodiment of the present invention.

FIG. 15 shows the memory requirement for data set 1284.

FIG. 16 shows the memory requirement for data set 2430.

FIG. 18 shows the number of popcount additions for data set 1284.

FIG. 19 shows the number of popcount additions for data set 2430.

FIG. 21 shows the normalized memory accesses to process a query string for data set 1284.

FIG. 22 shows the normalized memory accesses to process a query string for data set 2430.

DETAILED DISCLOSURE

Figure 4:
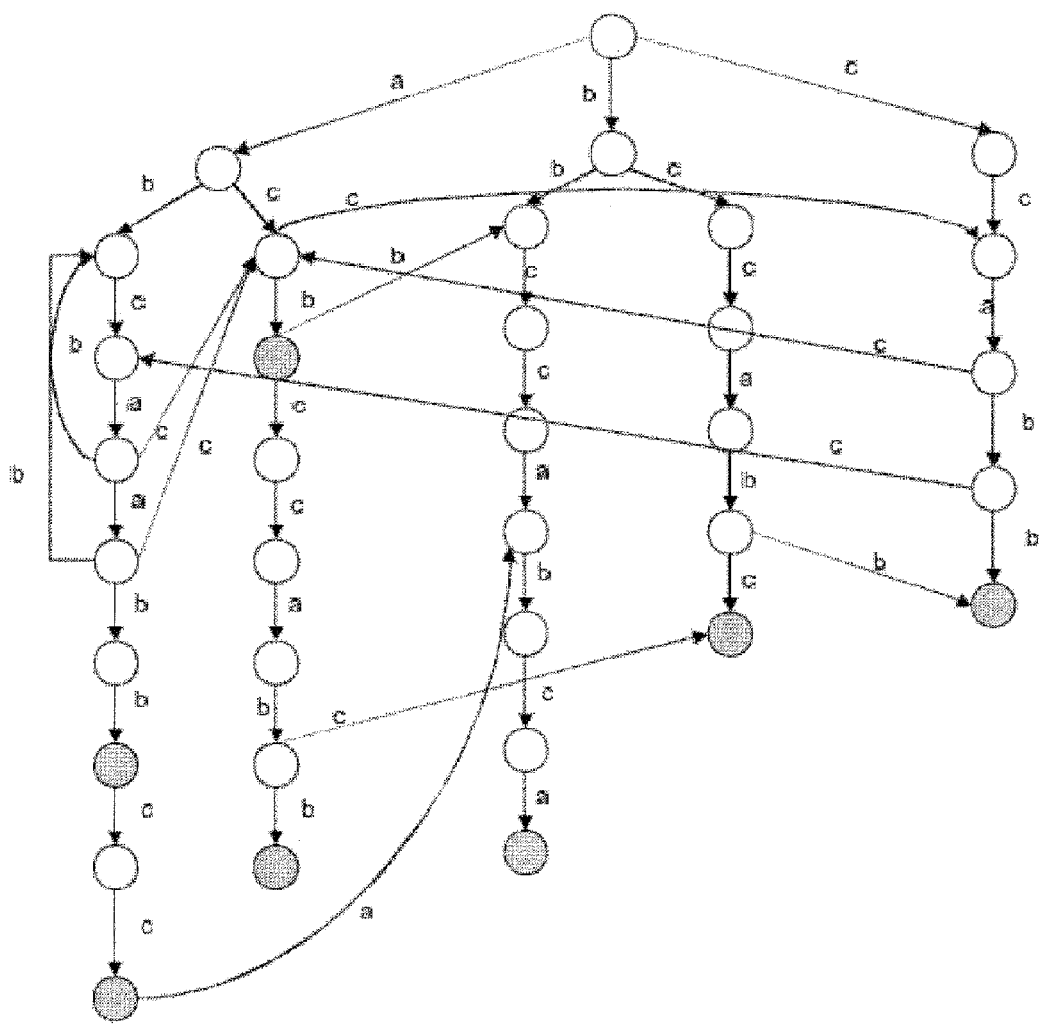
FIG. 4 shows a bitmap node according to Tuck et al.

The present invention relates to methods and structures for providing an efficient intrusion detection system (IDS). Specific embodiments of the present invention pertain to NIDSs (Network IDSs) involving unoptimized Aho-Corasick automata. Applications can include methods for multi-string matching. In one embodiment, a method is provided to compress the Aho-Corasick automaton by using large memory blocks of different length to store the Aho-Corasick automaton. For example, the memory blocks can include a bitmap node, a low degree node, and a path compressed node.

In an embodiment, multiple levels of summaries are used for popcount computation in network applications. The multiple levels of summaries can reduce the number of additions at each node. Three designs for summaries (Type I, Type II, and Type III Summaries) are provided. In one embodiment, labeled Type I, three levels of summaries are used with no table. In another embodiment, labeled Type II, three levels of summaries are used in which the third level is a table. In yet another embodiment, labeled Type III, two levels of summaries are used in which the second level is a table. Examples of Type I, Type II, and Type II summaries for a 256-bit bitmap are described below. It should be noted that although the examples illustrate summaries for a 256-bit bitmap, embodiments are not limited thereto. The methods described herein can be extended to any size character set by one skilled in the art in light of the disclosure herein, and are to be included within the spirit and purview of this application.

1. Type I Summaries
Level 1 Summaries
The 256-bit bitmap is partitioned into 4 blocks of 64 bits each.
$S1(i)$ is the number of 1s in blocks 0 through $i-1$, $1 \leq i \leq 3$.
Level 2 Summaries
A collection of level 2 summaries are kept for each block j of 64 bits.
Each 64-bit block is partitioned into 16 4-bit sub-blocks.
$S2(j, i)$ is the number of 1s in sub-blocks 0 through $i-1$ of block j, $0 \leq j \leq 3$, $1 \leq i \leq 15$.
Level 3 Summaries
Each 4-bit sub-block is partitioned into two 2-bit sub-sub-blocks.
$S3(j, i, 1)$ is the number of is in sub-sub-block 0 of the $i^{th}$ 4-bit sub-block of the $j^{th}$ 64-bit block, $0 \leq j \leq 3$, $0 \leq i \leq 15$.

FIG. 7 shows a setup for Type I summaries. When Type I summaries are used, the popcount for position q (i.e., the number of is preceding position q), where $0 \leq q < 256$, of the bitmap can be obtained as follows:

Step 1: Position q is in sub-block $sb = \lfloor (q \mod 64)/4 \rfloor$ of block $b = \lfloor q/64 \rfloor$. The sub-sub-block ssb is 0 when q mod 4<2 and 1 otherwise.

Step 2: The popcount for position q is $S1(b)+S2(b, sb)+S3(b, sb, ssb)+bit(q-1)$, where $bit(q-1)$ is 0 if q mod 2=0 and is bit q-1 of the bitmap otherwise; $S1(0)$, $S2(b, 0)$ and $S3(b, sb, 0)$ are all 0.

As an example of this implementation, consider the case q=203. This bit is in sub-block $sb=\lfloor (203 \mod 64)/4 \rfloor = \lfloor 11/4 \rfloor = 2$ of block $b=\lfloor 203/64 \rfloor = 3$. Since 203 mod 4=3, the sub-sub-block ssb is 1. The popcount for bit 203 is the number of ones (1) in positions 0 through 191+the number in positions 192 through 199+those in positions 200 through 201+the number in position $202 = S1(3)+S2(3, 2)+S3(3, 2, 1)+bit(202)$.

Because the summaries are not stored for b, sb, and ssb equal to zero, the code to compute the popcount takes the form:

if (b) popcount=S1(b)
else popcount=0;
if (sb) popcount+=S2(b, sb);
if (ssb) popcount+=S3(b, sb, ssb);
if (q) popcount+=bit(q-1);

Using Type I summaries, a popcount can be determined with at most 3 additions whereas using only one level of summaries as taught by Tuck et al. may require up to 31 additions. However, this reduction in the number of additions can come at the expense of memory. An $S1(*)$ value lies between 0 and 192 and so requires 8 bits; an S2 value requires 6 bits and an S3 value requires 2 bits. So, $8*3=24$ bits are needed for the level-1 summaries, $6*15*4=360$ bits are needed for the level-2 summaries, and $2*1*16*4=128$ bits are needed for the level-3 summaries. Therefore, the Type I summaries according to this implementation require 512 bits (or 64 bytes). In contrast, the summaries of the 1-level scheme of Tuck et al. appear to require only 56 bits (or 7 bytes).

2. Type II Summaries
The Type II Summaries can follow the pattern described by J. Munro in "Foundations of Software Technology and Theoretical Computer Science" (1996) and "Succinct representation of data structures" (2005).
Level 1 Summaries
The 256-bit bitmap is partitioned into 4 blocks of 64 bits each.
$S1(i)$ is the number of 1s in blocks 0 through $i-1$, $1 \leq i \leq 3$.
Level 2 Summaries
A collection of level 2 summaries are kept for each block j of 64 bits.
Each 64-bit block is partitioned into 16 4-bit sub-blocks.
$S2(j, i)$ is the number of 1s in sub-blocks 0 through $i-1$ of block j, $0 \leq j \leq 3$, $1 \leq i \leq 15$.
Level 3 Summaries
S3 is a summary table such as T4 shown in FIG. 6.
$T4(0:15, 0:3)$ such that $T4(i, j)$ is the number of ones (1) in positions 0 through $j-1$ of the binary representation of i.

When Type II summaries are used, the popcount for position q of a bitmap is $S1(b)+S2(b, sb)+T4(d, e)$, where d is the integer whose binary representation is the bits in sub-block sb of block b of the bitmap and e is the position of q within this sub-block; S1 and SB are for the current state/bitmap.

Since $T4(i, j) \leq 3$, 2 bits are needed for each entry of T4 for a total of 128 bits for the entire table. Recognizing that rows 2j and 2j-1 are the same for every j, the even rows alone may be stored, which reduces storage cost to 64 bits. A further reduction in storage cost for T4 is possible by noticing that all values in column 0 of this array are 0 and so this column does not need to be explicitly stored.

Because only one copy of this table is needed for certain implementations of the subject intrusion detection system application, it is not necessary to apply the above described optimizations to reduce storage cost. Accordingly, the entire table can be stored at a storage cost of 128 bits.

The memory required for the level 1 and 2 summaries is $24+360=384$ bits (48 bytes), a reduction of 16 bytes compared to Type I summaries. When Type II summaries are used, a popcount can be determined with 2 additions rather than the 3 additions using Type I summaries or the 31 additions using the 1-level summaries of Tuck et al.

3. Type III Summaries
Type III Summaries are two-level summaries that make it possible to determine a popcount with only 1 addition. Here, Level 1 summaries are kept for the bitmap and a lookup table is used for the second level. For a 256-bit bitmap, the Type III Summaries can be as follows.
Level 1 Summaries
The 256-bit bitmap is partitioned into 16 blocks of 16 bits each.
$S1(i)$ is the number of 1s in blocks 0 through $i-1$, $1 \leq i \leq 15$.
Level 2 Summaries
S2 is a lookup table such as T16.
$T16(i, j)$ gives the number of ones (1) in positions 0 through $j-1$ of the binary representation of i, $0 \leq i < 65,536 = 2^{16}$, $0 \leq j < 16$.

When Type III Summaries are used, the popcount for position q of the bitmap is $S1(\lfloor q/16 \rfloor)+T16(d, e)$, where d is the integer whose binary representation is the bits in block $\lfloor q/16 \rfloor$ of the bitmap and e is the position of q within this sub-block; S1 and SB are for the current state/bitmap.

8*15=120 bits (or 15 bytes) of memory are required for the level-1 summaries of a bitmap compared to 7 bytes for the level-1 summaries of Tuck et al. The lookup table T16 requires $2^{16}*16*4$ bits as each table entry lies between 0 and 15 and so requires 4 bits. The total memory for T16 is 512 KB. For a table of this size, it is worth considering the optimizations mentioned earlier in connection with T4. Since rows 2j and 2j+1 are the same for all j, the table size is reduced to 256 KB by storing explicitly only the even rows of T16. Another 16 KB may be saved by not storing column 0 explicitly. Yet another 16 KB reduction is achieved by splitting the optimized table into two. Now, column 0 of one of them is all 0 and is all 1 in the other. So, column 0 may be eliminated. However, optimization below 256 KB may not be of much value as the increased complexity of using the table can outweigh the small reduction is storage.

Method for Compressing a Non-Optimized Automaton

It should be noted that the implementation of the subject methods utilizing 256 bits or characters is used merely as an example, and that a person of ordinary skill in the art, in reading the descriptions herein, can extend the method to any sized character set. As an example of a method for compressing the non-optimized Aho-Corasick automaton, a Snort data base is used. FIG. 8 profiles the states of the 3,578 strings observed in the Snort database in April, 2006 in the corresponding unoptimized Aho-Corasick automaton by degree (i.e., number of non-null success pointers in a state). As can be seen, there are only 36 states whose degree is more than 8 and the number of states whose degree is between 2 and 8 is 869. An overwhelming number of states (24,417) have a degree that is less than 2. However, 1639 of these 24,417 states are not in end-node sequences. From these observations, the number of the states can be classified into three categories, a high degree, middle degree, and low degree category of: B (states whose degree is more than 8), L (states whose degree is between 2 and 8) and O (all other states). B states are those that will be represented using a bitmap, L states are low degree states, and O states are states whose degree is one or zero. In case the distribution of states in future string data-bases changes significantly, a different classification of states can be used.

Next, a finer (two-letter) state classification is done as below and in the stated order.

BB: All B states are reclassified as BB states.

BL: All L states that have a sibling BB state are reclassified as a BL states.

BO: All O states that have a BB sibling are reclassified as BO states.

LL: All remaining L states are reclassified as LL states.

LO: All remaining O states that have an LL sibling are reclassified as LO states.

OO: All remaining O states are reclassified as OO states.

According to the present invention, three node types are used for the compressed representation: bitmap, low degree, and path compressed.

1. Bitmap Node

A bitmap node can have, as an example, a 256-bit bitmap together with summaries. Any of the three summary types (Type I, Type II, Type III) can be used. When. Type II or Type III summaries are used, only one copy of the lookup table (T4 or T16) is needed for the entire automaton. All bitmap nodes may share this single copy of the lookup table. When Type II summaries are used, the 128 bits needed by the unoptimized T4 are insignificant compared to the storage required by the remainder of the automaton. For Type III summaries, however, using a 512 KB unoptimized T16 is quite wasteful of memory and it is desirable to go down to at least the 256 KB version.

The memory required for a bitmap node depends on the summary type that is used. When Type I summaries are used, each bitmap node, as shown in FIG. 9, is 110 bytes. When Type II summaries are used, each bitmap node is 94 bytes. When Type III summaries are used, the node size is 61 bytes.

2. Low Degree Node

According to the example, low degree nodes are used for states that have between 2 and 8 success transitions. FIG. 10 shows the format of such a node. In addition to fields for the node type, failure pointer, failure pointer offset, rule list pointer, and first child pointer, a low degree node has the fields char1, ..., char8 for the up to 8 characters for which the state has a non-null success transition and size, which provides the number of these characters stored in the node. Since this number is between 2 and 8, 3 bits are sufficient for the size field. Although it is sufficient to allocate 22 bytes to a low degree node, 25 bytes are allocated here because this allows a path compressed node with up to 2 characters (i.e., an O2 node as described later) to be packed into a low degree node.

3. Path Compressed Node

Path compression is not limited to end node sequences. Rather, any sequence of states whose degree is either 1 or 0 is path-compressed. Further, variable-size path compressed nodes can be used so that both short and long sequences may be compressed into a single node with no waste. By using variable-size path compressed nodes, all the space in such a node is utilized and the node overhead is paid just once. The capacity of a path compressed node is limited in this example to 256 states. This requires that the failure pointer offsets in all nodes be at least 8 bits. A path compressed node whose capacity is c, $c \leq 256$, has c character fields, c failure pointers, c failure pointer offsets, c rule list pointers, 1 type field, 1 size field, and 1 next node field, as shown in FIG. 11.

In contrast, the path compression scheme of Tuck et al. describes an end-node sequence with 31 states using 7 nodes. In one of these, the capacity utilization is only 20% (only one of the available 5 slots is used). Additionally, the overhead of the type, next node, and size fields is incurred for each of the path compressed nodes.

Referring again to FIG. 11, the path compressed node of FIG. 11 is referred to as an O node. Five special types of O nodes—O1 through O5—also are used. An Ol node, $1 \leq l \leq 5$, is simply an O node whose capacity is exactly l characters. For these special O-node types, the capacity field can be dispensed with because the capacity may be inferred from the node type.

The type fields (node type and first child type) are 3 bits. Here, Type=000 for a bitmap node, Type=111 for a low degree node and Type=110 for an O node. The remaining 5 values for Type are assigned to Ol nodes. Since the capacity of an O node must be at least 6, the node's true capacity minus 6 is stored in its capacity field. As a result, an 8-bit capacity field suffices for capacities up to 261. However, since failure pointer offsets are 8 bits, an O node with capacity between 257 and 261 is not used. So, the limit on O node capacity is 256. The total size of a path compressed node O is 10c+6 bytes, where c is the capacity of the O node. The size of an Ol node is 10l+5 because the capacity field in such a node is not needed.

Memory Accesses

FIG. 12 and FIG. 13 show the access counts for different node and summary types for a few sample values of memory bandwidth W.

As an example, the following analysis is used to derive the memory access counts for the memory bandwidth W=32 using Type I summaries according to one embodiment of the present invention. Two examples (W=32 and W=1024) using the method of Tuck et al. are also provided below.

The number of memory accesses needed to process a node depends on the memory bandwidth W, how the node's fields are mapped to memory and whether or not a match is obtained at the node.

For the Bitmap Node with Type I Summaries, W=32, the bitmap node is mapped into memory by packing the node type, first child type, failure pointer offset fields, and two of the three Level-1 (L1) summaries into a 32-bit block; 2 bits of this block are unused. The remaining L1 summary (S1(3)) together with S2(0, *) are placed into another 32-bit block. The remaining Level-2 (L2) summaries are packed into 32-bit blocks; 5 summaries per block; 2 bits per block are unused. The Level-3 (L3) summaries occupy 4 memory blocks; the bitmap takes 8 blocks; and each of the 3 pointers takes a block.

When a bitmap node is reached, the memory block with type fields is accessed to determine the node's actual type. The rule pointer is accessed so all matching rules can be listed. A bitmap block is accessed to determine whether there is a match with the input string character. If the examined bit is 0, the failure pointer is accessed and the node pointed by this pointer is proceeded to; the failure pointer offset, which was retrieved from memory when the block with type fields was accessed, is used to move to the proper place in the node pointed at by the failure pointer in case this node is a path compressed node. So, the total number of memory accesses when there is not a match is 4. When the examined bit of the bitmap is 1, a popcount is computed. This may require between 0 and 3 memory accesses (for example, 0 are needed when bit 0 of the bitmap is examined or when the only summary required is S1(1) or S1(2)). Using the computed popcount, the first child pointer (another memory access) and the first child type (cannot be that of an O node), the next node in the data structure is moved to. A total of four to seven memory accesses are made.

For the Low Degree Node, W=32, the type fields, size field, failure pointer offset field, and the char 1 field are packed into a memory block; 7 bits are unused. The remaining seven char fields are packed into 2 blocks leaving 8 bits unused. Each of the pointer fields occupies a memory block. When a low degree node is reached, the memory block is accessed with type fields as well as the rule pointer. To determine whether there is a match at this node, an ordered sequential search is performed of the up to 8 characters stored in the node. Let i denote the number of characters examined. For i=1, no additional memory access is required, one additional access is required when $2 \leq i \leq 5$, and 2 accesses are required when $6 \leq i \leq 8$. In case of no match the failure pointer is accessed; the first child pointer is retrieved in case of a match. The total number of memory accesses to process a low degree node is three to five regardless of whether there is a match.

For Ol, $1 \leq l \leq 5$, Nodes, W=32, the type, failure pointer offset, and char 1 fields are placed into a memory block; the rule, failure and first child pointers are placed into individual memory block. To process an O1 node, the type block is first retrieved and then the rule pointer is retrieved. The rule pointer is used to list the matching rules. Then, it is compared with char 1, which is the retrieved type block. If there is a match, the first child pointer is retrieved and the node pointed at is proceeded to. In case of no match, the failure pointer is retrieved, which together with the offset in the type block leads to the next node. So, three accesses are needed when an O1 node is reached.

The mapping for an O2 node is similar to that used for an O1 node. This time, the type block contains char 1 and char 2, the additional rule pointer and failure offset pointers are placed in separate blocks. The number of memory accesses needed to process such a node is three when only char 1 is examined (this happens when there is a mismatch at char 1). When char 2 also is examined an additional rule pointer is retrieved. For a mismatch, we must retrieve the second failure pointer as well as its failure pointer offset. So, five accesses are needed. For a match, four accesses are required. So, in case of a mismatch in an O2 node, three or five accesses are needed; otherwise, four are needed.

For O3 nodes, char 3 and its associated failure pointer offset is placed into the memory block of O2 that contains the second failure pointer offset. The associated rule and failure pointers are placed in separate memory blocks. When all three characters are matched, six memory accesses are needed. When a mismatch occurs at char 1, there are three accesses; at char 2, there are five accesses; and at char 3, there are six accesses.

An alternative mapping for an O3 node places the data fields into memory in the following order: node and first child type fields (1 byte total), pairs of character and rule pointer fields ((char j, rule pointer j), 5 bytes per pair), first child pointer (4 bytes), pairs of failure pointer and failure pointer offsets (5 bytes per pair). When i characters are examined, $\lceil (1+5i)/4 \rceil$ blocks are retrieved to process the characters and their rule pointers. In case of a mismatch at character i, two additional accesses are needed to retrieve the corresponding failure pointer and its offset. In case of a match, a single additional memory access gets the first child pointer. So, the total number of memory accesses is $\lceil (1+5i)/4 \rceil +2$ when there is a mismatch and $\lceil (1+5i)/4 \rceil +1$ when all characters in the nodes are matched. When this alternative matching is used, a mismatch at character i, $1 \leq i \leq 3$ takes four, five, and six memory accesses, respectively. When there is no mismatch, five memory accesses are required.

For an O4 node, the original O3 mapping is extended by placing char 3, char 4, and offset pointers 3 and 4 in one memory block; and offset pointer 2 in another. Rule and failure pointers occupy one block each. When all four characters are matched, seven memory accesses are needed. A mismatch at character i, $1 \leq i \leq 4$, results in three, five, six, and seven accesses, respectively.

An O5 node is mapped with chars 3, 4, 5 and offset pointer 3 in a memory block and offset pointers 2, 4, and 5 in another. When all five characters in an O5 node are matched, there are eight memory accesses. When there is a mismatch at character i, $1 \leq i \leq 5$, the number of memory accesses is three, five, six, eight, and nine, respectively.

For O Nodes, W=32 and 1024, the alternative mapping described above for O3 nodes can be extended. Fields are mapped to memory in the order: node type, first child type, and capacity fields (2 bytes total), pairs of character and rule pointer fields ((char j, rule pointer j), 5 bytes per pair), first child pointer (4 bytes), pairs of failure pointer and failure pointer offsets (5 bytes per pair). The memory access analysis is similar to that for O3 nodes and the total number of memory accesses, when W=32, is $\lceil (2+5i)/4 \rceil +2$ when there is a mismatch and $\lceil (2+5i)/4 \rceil +1$ when all characters in the nodes are matched.

When W=1024, an O node fits into a single memory block provided its capacity, c, is no more than 12. Hence, for $c \leq 12$, a single memory access suffices to process this node. When c>12, the memory access count using the above mapping is $\lceil(2+5i)/128\rceil+1$. Since $i \leq c \leq 256$, at most 12 memory access are need to process an O node when W=1024.

For the Path Compressed Node of Tuck et al., when W=32, the type, size, failure offset 1, and char 1 through 3 fields of the path compressed node according to Tuck et al. may be mapped into a single memory block. The char 4 and 5 fields together with the 4 remaining failure pointer offset fields may be mapped into another memory block. For a mismatch at char 1, block 1, rule pointer 1, and failure pointer 1 needs to be accessed for a total of three memory accesses. For a failure at char i, $2 \leq i \leq size$, block 2 and an additional i−1 rule pointers also need to be accessed. The memory access count is 3+i.

Notice that since Tuck et al. path compresses end-node sequences only, a failure must occur whenever a path compressed node is processed whose size is less than 5 as the last state in such a node has no success transition (i.e., its degree is 0 in the Aho-Corasick automaton). Hence, for a match at this node, it may be assumed that the size is 5. The two blocks, 5 rule pointers, and the first child pointer are accessed. The total number of memory accesses is 8.

For the Path Compressed Node of Tuck et al., when W=1024, all 52 bytes of the path compressed node fit in a memory block. So, only one memory access is needed to process the node. Note that for an end-node sequence with 256 states, 53 path compressed nodes are used. The number of worst-case accesses to go through this end-node sequence is 53. In contrast using the O node according to an embodiment of the present invention, only 12 memory accesses are made in the worst case.

Referring to FIGS. 12 and 13, the rows labeled B (bitmap), L (low degree), Ol (O1 through O5), and O refer to node types for our structure while those labeled TB (bitmap) and TO (one degree) refer to node types in the structure of Tuck et al. The counts of FIG. 12 and FIG. 13 are specific to a certain mapping of the fields of a node to memory. Using a different mapping will change the memory access count. However, the mappings are quite reasonable and that using alternative mappings may not improve these counts in any significant manner.

Mapping States to Nodes

1. Category BX, $X \in \{B, L, O\}$, states are mapped to 1 bitmap node each; sibling states are mapped to nodes that are contiguous in memory. In the case of BL and BO states, only a portion of a bitmap node is used.

2. Maximal sets of LX, $X \in \{L, O\}$, states that are siblings are packed into unused space in a bitmap node created in the first step using 25 bytes per LX state and the low degree structure of FIG. 10. If there are, for example, 3 LX states that are siblings and there is a bitmap node with at least 75 bytes of unused space, all three siblings are packed into this unused space. If there is no bitmap node with this much unutilized space, none of the three siblings is packed into a bitmap node. The packing of sibling LX nodes is done in non-increasing order of the number of siblings. By packing all siblings into a single bitmap node, any child of a bitmap node using its first child pointer, the child's rank (i.e., index in the layout of contiguous siblings), and the size of the first child (this is determined by the type of the first child) can be accessed. When an LO state whose child is an OO state is mapped in this way, it is mapped together with its lone OO-state child into a single 25-byte O2 node, which is the same size as a low degree node.

3. The remaining LX states are mapped into low degree nodes (LL states) or O2 nodes (LO states). LL states are mapped one state per low degree node. When an LO state whose child is an OO state is mapped in this way, it is mapped together with its lone OO-state child into a single 25-byte O2 node. Sibling states are mapped to nodes that are contiguous in memory.

4. The chains of remaining OO states are handled in groups where a group is comprised of chains whose first nodes are siblings. In each group, the length, l, of the shortest chain is obtained. If l>5, set l=5. Each chain is mapped to an O1 node followed by an O node. The Ol nodes for the group are in contiguous memory. Note that an O node can only be the child of an Ol node or another O node.

Experimental Results

An implementation of the present invention is compared with that of Tuck et al. in terms of number of nodes, memory requirement, popcount computation, and memory access. Two data sets of strings extracted from Snort rule sets are used. The first data set has 1284 strings and the second has 2430 strings. Each data set is named by the number of strings in the data set.

1. Number of Nodes: The number of nodes of each type in the compressed Aho-Corasick structure for each string set when summaries of Type I are used are shown in FIG. 14. The numbers are similar for the other two summary types. The maximum capacity of an allocated O node was 128 for data set 1284 and 256 for data set 2430.

Figure 17:
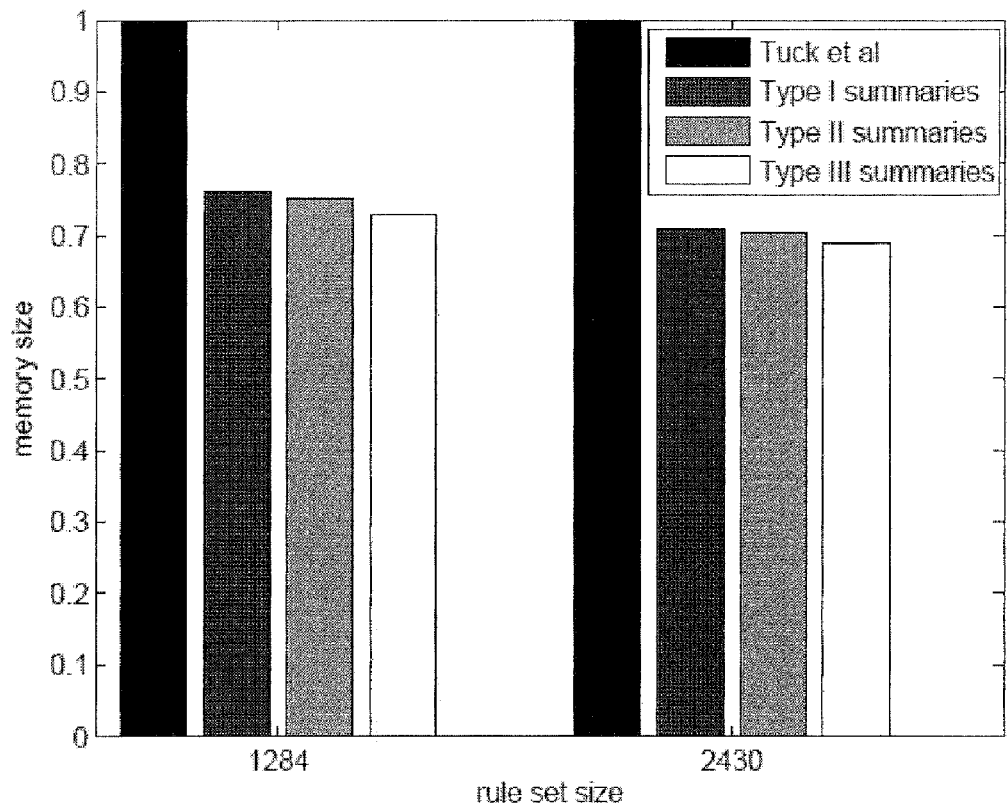
FIG. 17 shows a plot of normalized memory requirements using the information in FIGS. 15 and 16.

2. Memory Requirement: Although the total number of nodes used according to embodiments of the present invention is less than that used by Tuck et al., the subject nodes are larger and so the potential remains that more memory is used in embodiments of the present invention than used by the structure of Tuck et al. FIGS. 15 and 16 indicate the number of bytes of memory used by the structure of Tuck et al. and that of the present invention for each of the different summary types (Type I, Type II, and Type III). The size of a B node depends on the summary type that is used. According to one implementation, the B node size is 110 bytes for Type I summaries, 94 bytes for Type II summaries, and 61 bytes for Type III summaries. The memory numbers shown in FIG. 15 and FIG. 16 do not include the 16 bytes (or less) needed for the single T4 table used by Type II summaries or the 256 KB needed by the T16 table used by Type I summaries. In the case of Type II summaries, adding in the 16 bytes needed by T4 does_not materially affect the numbers reported in FIGS. 15 and 16. For Type III summaries, the 256 KB needed for T16 is more than what is needed for the rest of the data structure. However, as the data set size increases, this 256 KB remains unchanged and fixed at 256 KB. The row labeled Normalized gives the memory required normalized by that required by the structure of Tuck et al. The normalized values are plotted in FIG. 17. The structures of the present invention take between 20% and 30% less memory than is required by the structure of Tuck et al. With the 256 KB required by T16 added in for Type III summaries, the Type III representation takes twice as much memory as Tuck et al. takes for the 1284 data set and 75% more for the 2430 data set. As the size of the data set increases, Type II summaries are expected to be more competitive than the structure of Tuck et al. on total memory required.

Figure 20:
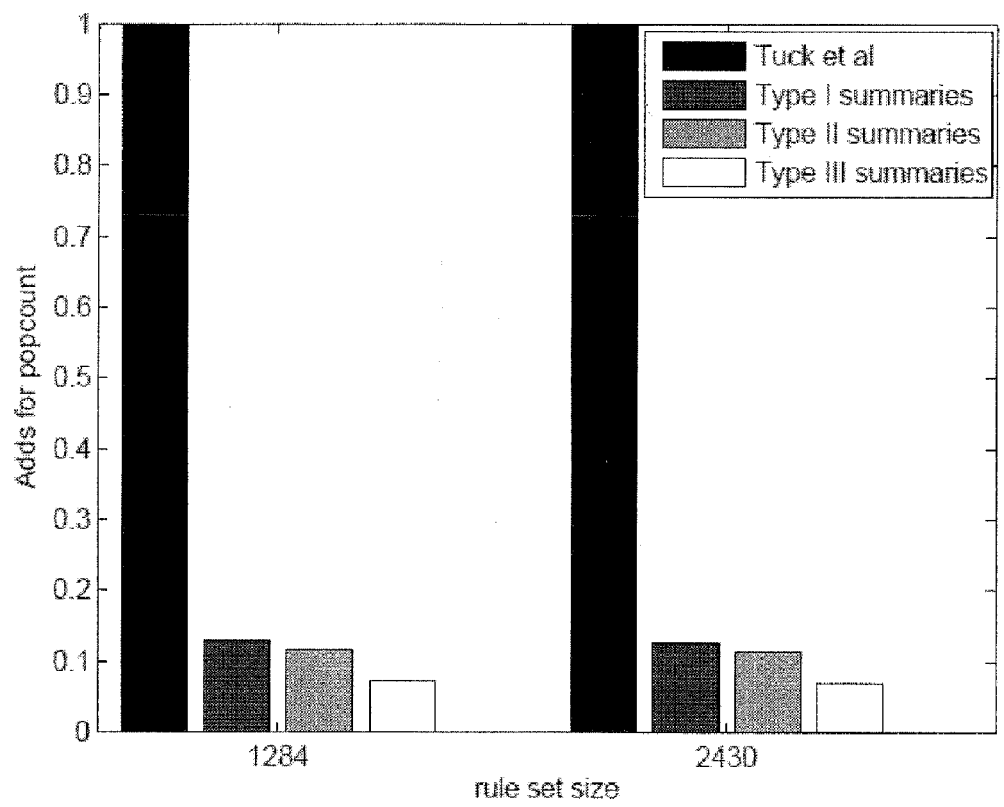
FIG. 20 shows a plot of normalized additions for popcount using the information in FIGS. 18 and 19.

3. Popcount: FIGS. 18 and 19 show the total number of additions required to compute popcounts when using each of the data structures. For this experiment, 5 query strings are used, which are obtained by concatenating a differing number of real emails that were classified as spam by a spam filter. The string lengths varied from 1 MB to 5 MB and the number of additions is counted for reporting all occurrences of all strings in the Snort data sets (1284 or 2430) in each of the query strings. The last row of each figure is the total number of adds for all 5 query strings normalized by the total for the structure of Tuck et al. The normalized values are plotted in FIG. 20. When Type III summaries are used, the number of popcount additions is only 7% that used by the structure of Tuck et al. Type I and Type II summaries require about 13% and 12%, respectively, of the number of additions required by Tuck et al.

4. Memory Accesses: FIGS. 21 and 22 show the normalized number of memory accesses required to process our query strings. The data is normalized using the total memory access count for the method of Tuck et al. Since the normalized numbers were virtually the same for each of the 5 query strings, only the numbers for the first query string are provided. The number of memory accesses using the data structure according to embodiments of the present invention is generally larger than that of Tuck et al. However, as the memory bandwidth increases, the difference between the two schemes becomes very small (0.1% to 0.4% when W=1024) on this metric.

It should be understood that the examples and embodiments described herein are for illustrative purposes only and that various modifications or changes in light thereof will be suggested to persons skilled in the art and are to be included within the spirit and purview of this application.

In addition, any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

REFERENCES

[1] A. Aho and M. Corasick, Efficient string matching: An aid to bibliographic search, CACM, 18, 6, 1975, 333-340.
[2] S. Antonatos, K. Anagnostakis and E. Markatos, Generating realistic workloads for network intrusion detection systems, *ACM Workshop on Software and Performance*, 2004.
[3] F. Baboescu, S. Singh and G. Varghese, Packet Classification for Core Routers: Is there an alternative to CAMs? *INFOCOM*, 2003.
[4] R. Bace and P. Mell, Intrusion detection systems, *NIST Special Publication on IDSs*.
[5] M. Degermark, A. Brodnik, S. Carlsson, and S. Pink, Small forwarding tables for fast routing lookups, *ACM SIGCOMM*, 1997, 3-14.
[6] S. Dharamapurikar and J. Lockwood, Fast and scalable pattern matching for content filtering, *ANCS*, 2005.
[7] H. Dreger, A. Feldmann, M. Mai, V. Paxson and R. Sommer, Dynamic application-layer protocol analysis for network intrusion detection, *USENIX Security Symposium*, 2006.
[8] H. Dreger, C. Kreibach, V. Paxson, and R. Sommer, Enhancing the accuracy of network-based intrusion detection with host-based context, *DIMVA*, 2005.
[9] W. Eatherton, G. Varghese, Z. Dittia, Tree bitmap: hardware/software IP lookups with incremental updates, *Computer Communication Review*, 34(2): 97-122, 2004.
[10] Y. Fang, R. Katz and T. Lakshman, Gigabit rate packet pattern-matching using TCAM, *ICNP*, 2004.
[11] J. Gonzalez and V. Paxson, Enhancing network intrusion detection with integrated sampling and filtering, *RAID*, 2006.
[12] G. Jacobson, Succinct Static Data Structure, *Carnegie Mellon University Ph. D Thesis*, 1998.
[13] J. Lockwood, C. Neely, and C. Zuver, An extensible system-on-programmable-chip, content-aware Internet firewall.
[14] H. Lu and S. Sahni, O(log W) multidimensional packet classification, *IEEE/ACM Transactions on Networking*, 15, 2, 2007, 462-472.
[15] W. Lu and S. Sahni, Packet classification using two-dimensional multi-bit tries, *IEEE Symposium on Computers and Communications*, 2005.
[16] W. Lu and S. Sahni, Packet classification using pipelined two-dimensional multibit tries, *IEEE Symposium on Computers and Communications*, 2006.
[17] W. Lu and S. Sahni, Succinct representation of static packet classifiers, *IEEE Symposium on Computers and Communications*, 2007.
[18] J. Lunteran and A. Engbersen, Fast and scalable packet classification using, *IEEE JSAC*, 21, 4, 2003, 560-571.
[19] J. Lunteren, High-performance pattern-matching for intrusion detection, *INFOCOM*, 2006.
[20] J. Munro, Tables, *Foundations of Software Technology and Theoretical Computer Science*, LNCS, 1180, 37-42, 1996.
[21] J. Munro and S. Rao, Succinct representation of data structures, in *Handbook of Data Structures and Applications*, D. Mehta and S. Sahni ed., Chapman & Hall/CRC, 2005.
[22] V. Paxson, Bro: A system for detecting network intruders in real-time, *Computer Networks*, 31, 1999, 2435-2463.
[23] S. Sahni, *Data structures, algorithms, and applications in C++*, Second Edition, Silicon Press, 2005.
[24] S. Singh, F. Baboescu, G. Varghese, and J. Wang, Packet classification using multidimensional cutting, *ACM Sigcomm*, 8, 2003.
[25] Snort users manual 2.6.0, 2006.
[26] http://www.snort.org/dl.
[27] R. Sommer and V. Paxson, Exploiting independent state for network intrusion detection, *ACSAC*, 2005.
[28] H. Song, J. Turner, and J. Lockwood, Shape shifting tries for faster IP route lookup, *ICNP*, 2005.
[29] H. Song, et al. Snort offloader: A reconfigurable hardware NIDS filter, *FPL* 2005.
[30] H. Song and J. Lockwood, Efficient packet classification for network intrusion detection, *FPGA*, 2005.
[31] D. Taylor and J. Turner, ClassBench: A packet classification benchmark, *INFOCOM*, 2005.
[32] N. Tuck, T. Sherwood, B. Calder and G. Varghese, Deterministic memory-efficient string matching algorithms for intrusion detection, *INFOCOM*, 2004.
[33] M. Waldvogel, G. Varghese, J. Turner, and B. Plattner, Scalable high-speed prefix matching, *ACM Trans. on Computer Systems*, 19, 4, 440-482, 2001.
[34] S. Wu and U. Manber, Agrep—a fast algorithm for multi-pattern searching, Technical Report, Department of Computer Science, University of Arizona, 1994.
[35] M. Yazdani, W. Fraczak, F. Welfeld, and I. Lambadaris, Two level state machine architecture for content inspection engines, *INFOCOM* 2006.

[36] F. Yu and R. Katz, Efficient multi-match packet classification with TCAM.

What is claimed is:

1. A method for network intrusion detection, comprising:
compressing an unoptimized Aho-Corasick automaton, wherein compressing the unoptimized Aho-Corasick automaton comprises:
classifying states of the unoptimized Aho-Corasick automaton by the number of non-null success pointers in a state into three categories, wherein the three categories represent low degree, middle degree and high degree states; and
storing each state of the unoptimized automaton in a plurality of memory blocks in a storage media, wherein a first memory block in the plurality of memory blocks is a bitmap node for states classified in the high degree category, wherein a second memory block in the plurality of memory blocks is a low degree node for states classified in the middle degree state category, and wherein a third memory block in the plurality of memory blocks is a path compressed node for states classified in the low degree category,
wherein the bitmap node comprises multiple levels of summaries for performing popcount computation,
wherein the bitmap node comprises three levels of summaries, wherein a first level comprises blocks of bits, wherein a second level comprises sub-blocks of bits, and wherein a third level comprises sub-sub-blocks of bits.

2. The method according to claim 1, wherein the bitmap of the bitmap node comprises 256 bits;
wherein the first level comprises 4 blocks of 64 bits each, and the number of 1s in blocks 0 through i−1 is given as S1(i), where $1 \leq i \leq 3$;
wherein the second level comprises 16 4-bit sub-blocks for each 64-bit block, and the number of 1s in sub-blocks 0 through i−1 of block j is given as S2(j, i), where $1 \leq j \leq 3$ and $1 \leq i \leq 15$;
wherein the third level comprises 2 2-bit sub-sub-blocks for each 4-bit sub-block, and the number of 1s in sub-sub-block 0 of the ith 4-bit sub-block of the jth 64-bit block is given as S3(j, i, 1), where $0 \leq j \leq 3$ and $0 \leq i \leq 15$.

3. The method according to claim 2, wherein performing the popcount computation comprises:
selecting a position q of the bitmap, where $0 \leq q < 256$ and wherein the position q is in sub-block sb=(q mod 64)/4 of block b=q/64 and wherein the sub-sub-block is 0 when (q mod 4)<2 and ssb is 1 when (q mod 4) is not less than 2; and
determining S1(b)+S2(b, sb)+S3(b, sb, ssb)+bit(q−1), where bit(q−1) is 0 if (q mod 2)=0, bit(q−1) is bit q−1 of the bitmap if (q mod 2) does not equal zero, and S1(0), S2(b, 0) and S3(b, sb, 0) are all 0.

4. The method according to claim 1, wherein the low degree node comprises stored characters for which the low degree state has a non-null success transition and a memory field providing the number of these characters stored for each low degree node.

5. The method according to claim 1, wherein the path compressed node comprises a capacity of 256 states.

6. The method according to claim 1, wherein the path compressed node is an O node having a capacity of l characters where $1 \leq l \leq 5$.

7. The method according to claim 1, wherein the path compressed node comprises any sequence of states whose degree is either 1 or 0.

8. A non-transitory computer readable storage medium having instructions encoded thereon, which when executed by a computing platform result in execution of the method of claim 1.

9. A method for network intrusion detection, comprising:
compressing an unoptimized Aho-Corasick automaton, wherein compressing the unoptimized Aho-Corasick automaton comprises:
classifying states of the unoptimized Aho-Corasick automaton by the number of non-null success pointers in a state into three categories, wherein the three categories represent low degree, middle degree and high degree states; and
storing each state of the unoptimized automaton in a plurality of memory blocks in a storage media, wherein a first block in the plurality of memory blocks is a bitmap node for states classified in the high degree category, wherein a second memory block in the plurality of memory blocks is a low degree node for states classified in the middle degree state category, and wherein a third memory blocking the plurality of memory blocks is a path compressed node for states classified in the low degree category,
wherein the bitmap node comprises multiple levels of summaries for performing popcount computation,
wherein the bitmap node comprises three levels of summaries, wherein a first level comprises blocks of bits, wherein a second level comprises sub-blocks of bits, and wherein a third level comprises a summary table.

10. The method according to claim 9, wherein the bitmap of the bitmap node comprises 256 bits;
wherein the first level comprises 4 blocks of 64 bits each, and the number of 1s in blocks 0 through i−1 is given as S1(i), where $1 \leq i \leq 3$;
wherein the second level comprises 16 4-bit sub-blocks for each 64-bit block, and the number of 1s in sub-blocks 0 through i−1 of block j is given as S2(j, i), where $1 \leq j \leq 3$ and $1 \leq i \leq 15$;
wherein the third level comprises a summary table T having stored therein a binary representation of i, wherein the number of 1s in positions 0 through j−1 of the binary representation of i is given as T(i,j) where $0 \leq j \leq 3$ and $0 \leq i \leq 15$.

11. The method according to claim 10, wherein performing the popcount computation comprises:
selecting a position q of the bitmap, where $0 \leq q < 256$ and wherein the position q is in sub-block sb=(q mod 64)/4 of block b=q/64; and
determining S1(b)+S2(b, sb)+T(d, e), where d is an integer whose binary representation is the bits in sub-sub-block sb of block b of the bitmap, and where e is the position of q within this sub-block.

12. A non-transitory computer readable storage medium having instructions encoded thereon, which when executed by a computing platform result in execution of the method of claim 9.

13. A method for network intrusion detection, comprising:
compressing an unoptimized Aho-Corasick automaton, wherein compressing the unoptimized Aho-Corasick automaton comprises:
classifying states of the unoptimized Aho-Corasick automaton by the number of non-null success pointers in a state into three categories, wherein the three categories represent low degree, middle degree and high degree states; and
storing each state of the unoptimized automaton in a plurality of memory blocks in a storage media, wherein a first memory block in the plurality of memory blocks is a bitmap node for states classified in the high degree category, wherein a second memory block in the plurality of memory blocks is a low degree node for states classified in the middle degree state category, and wherein a third memory block in the plurality of memory blocks is a path compressed node for states classified in the low degree category, wherein the bitmap node comprises multiple levels of summaries for performing popcount computation, wherein the bitmap node comprises two levels of summaries, wherein a first level comprises blocks of bits, and wherein a second level comprises a lookup table.

14. The method according to claim 13, wherein the bitmap of the bitmap node comprises 256 bits;

wherein the first level comprises 16 blocks of 16 bits each, and the number of 1s in blocks 0 through i−1 is given as $S1(i)$, where $1 \leq i \leq 15$;

wherein the second level comprises a lookup table T having stored therein a binary representation of i, wherein the number of 1s in positions 0 through j−1 of the binary representation of i is given as $T(i,j)$ where $0 \leq j \leq 16$ and $0 \leq i \leq 2^{16}$.

15. The method according to claim 14, wherein performing the popcount computation comprises:

selecting a position q of the bitmap, where $0 \leq q < 256$ and wherein the position q is in block $b = q/16$; and determining $S1(b) + T(d, e)$, where d is an integer whose binary representation is the bits in block b of the bitmap, and where e is the position of q within this block.

16. A non-transitory computer readable storage medium having instructions encoded thereon, which when executed by a computing platform result in execution of the method of claim 13.

17. A method for multi-string matching, comprising:

compressing an automaton of finite state machines comprising a failure pointer and at least one success pointer for each state, wherein compressing the automaton of finite state machines comprises:

classifying the states by the number of non-null success pointers in each state into categories, wherein the categories comprise a first category of states represented using a bitmap, a second category of states for low degree states, and a third category of states for states having one or zero non-null success pointers; and storing the categorized states in memory; and using the compressed automaton to perform the multi-string matching, wherein storing the categorized states in memory comprises storing states from the first category into a first memory block for bitmap nodes, storing states from the second category into a second memory block for low degree nodes, and storing states from the third category into a third memory block for path compressed nodes, wherein the bitmap node comprises three levels of summaries for performing popcount computation, wherein a first level comprises blocks of bits, wherein a second level comprises sub-blocks of bits, and wherein a third level comprises sub-sub-blocks of bits.

18. The method according to claim 17, wherein the bitmap of the bitmap node comprises 256 bits;

wherein the first level comprises 4 blocks of 64 bits each, and the number of 1s in blocks 0 through i−1 is given as $S1(i)$, where $1 \leq i \leq 3$;

wherein the second level comprises 16 4-bit sub-blocks for each 64-bit block, and the number of 1s in sub-blocks 0 through i−1 of block j is given as $S2(j, i)$, where $1 \leq j \leq 3$ and $1 \leq i \leq 15$;

wherein the third level comprises 2 2-bit sub-sub-blocks for each 4-bit sub-block, and the number of 1s in sub-sub-block 0 of the ith 4-bit sub-block of the jth 64-bit block is given as $S3(j, i, 1)$, where $0 \leq j \leq 3$ and $0 \leq i \leq 15$.

19. The method according to claim 18, wherein performing the popcount computation comprises:

selecting a position q of the bitmap, where $0 \leq q < 256$ and wherein the position q is in sub-block $sb = (q \bmod 64)/4$ of block $b = q/64$ and wherein the sub-sub-block is 0 when $(q \bmod 4) < 2$ and ssb is 1 when $(q \bmod 4)$ is not less than 2; and determining $S1(b) + S2(b, sb) + S3(b, sb, ssb) + bit(q−1)$, where $bit(q−1)$ is 0 if $(q \bmod 2) = 0$, $bit(q−1)$ is bit q−1 of the bitmap if $(q \bmod 2)$ does not equal zero, and $S1(0)$, $S2(b, 0)$ and $S3(b, sb, 0)$ are all 0.

20. The method according to claim 17, wherein the low degree node comprises stored characters for which the low degree state has a non-null success transition and a memory field providing the number of these characters stored for each low degree node.

21. The method according to claim 17, wherein the path compressed node comprises a capacity of 256 states.

22. The method according to claim 17, wherein the path compressed node is an 0 node having a capacity of l characters where $1 \leq l \leq 5$.

23. A non-transitory computer readable storage medium having instructions encoded thereon, which when executed by a computing platform result in execution of the method of claim 17.

24. A method for multi-string matching, comprising:

compressing an automaton of finite state machines comprising a failure pointer and at least one success pointer for each state, wherein compressing the automaton of finite state machines comprises:

classifying the states by the number of non-null success pointers in each state into categories, wherein the categories comprise a first category of states represented using a bitmap, a second category of states for low degree states, and a third category of states for states having one or zero non-null success pointers; and storing the categorized states in memory; and using the compressed automaton to perform the multi-string matching, wherein storing the categorized states in memory comprises storing states from the first category into a first memory block for bitmap nodes, storing states from the second category into a second memory block for low degree nodes, and storing states from the third category into a third memory block for path compressed nodes, wherein the bitmap node comprises three levels of summaries for performing popcount computation, wherein a first level comprises blocks of bits, wherein a second level comprises sub-blocks of bits, and wherein a third level comprises a summary table.

25. The method according to claim 24, wherein the bitmap of the bitmap node comprises 256 bits;

wherein the first level comprises 4 blocks of 64 bits each, and the number of 1s in blocks 0 through i−1 is given as $S1(i)$, where $1 \leq i \leq 3$;

wherein the second level comprises 16 4-bit sub-blocks for each 64-bit block, and the number of 1s in sub-blocks 0 through i−1 of block j is given as S2(j, i), where $1 \leq j \leq 3$ and $1 \leq i \leq 15$;

wherein the third level comprises a summary table T having stored therein a binary representation of i, wherein the number of 1s in positions 0 through j−1 of the binary representation of i is given as T(i, j) where $0 \leq j \leq 3$ and $0 \leq i \leq 15$.

26. The method according to claim 25, wherein performing the popcount computation comprises:

selecting a position q of the bitmap, where $0 \leq q < 256$ and wherein the position q is in sub-block sb=(q mod 64)/4 of block b=q/64; and determining S1(b)+S2(b, sb)+T(d, e), where d is an integer whose binary representation is the bits in sub-sub-block sb of block b of the bitmap, and where e is the position of q within this sub-block.

27. A non-transitory computer readable storage medium having instructions encoded thereon, which when executed by a computing platform result in execution of the method of claim 24.

28. A method for multi-string matching, comprising:

compressing an automaton of finite state machines comprising a failure pointer and at least one success pointer for each state, wherein compressing the automaton of finite state machines comprises:

classifying the states by the number of non-null success pointers in each state into categories, wherein the categories comprise a first category of states represented using a bitmap, a second category of states for low degree states, and a third category of states for states having one or zero non-null success pointers; and storing the categorized states in memory; and using the compressed automaton to perform the multi-string matching, wherein storing the categorized states in memory comprises storing states from the first category into memory blocks for bitmap nodes, storing states from the second category into memory blocks for low degree nodes, and storing states from the third category into memory blocks for path compressed nodes, wherein the bitmap node comprises two levels of summaries for performing popcount computation, wherein a first level comprises blocks of bits, and wherein a second level comprises a lookup table.

29. The method according to claim 28, wherein the bitmap of the bitmap node comprises 256 bits;

wherein the first level comprises 16 blocks of 16 bits each, and the number of 1s in blocks 0 through i−1 is given as S1(i), where $1 \leq i \leq 15$;

wherein the second level comprises a lookup table T having stored therein a binary representation of i, wherein the number of 1s in positions 0 through j−1 of the binary representation of i is given as T(i,j) where $0 \leq j \leq 16$ and $0 \leq i \leq 2^{16}$.

30. The method according to claim 29, wherein performing the popcount computation comprises:

selecting a position q of the bitmap, where $0 \leq q < 256$ and wherein the position q is in block b=q/16; and determining S1(b)+T(d, e), where d is an integer whose binary representation is the bits in block b of the bitmap, and where e is the position of q within this block.

31. A non-transitory computer readable storage medium having instructions encoded thereon, which when executed by a computing platform result in execution of the method of claim 28.

* * * * *

UNITED STATES PATENT AND TRADEMARK OFFICE
CERTIFICATE OF CORRECTION

| | | |
|---|---|---|
| PATENT NO. | : 8,272,056 B2 | Page 1 of 1 |
| APPLICATION NO. | : 12/678169 | |
| DATED | : September 18, 2012 | |
| INVENTOR(S) | : Sartaj Kumar Sahni et al. | |

It is certified that error appears in the above-identified patent and that said Letters Patent is hereby corrected as shown below:

Column 7,
Line 36, "number of is in" should read --number of 1s in--.
Line 40, "number of is preceding" should read --number of 1s preceding--.

Column 8,
Line 37, "2j and 2j–1 are the same" should read --2j and 2j+1 are the same--.

Column 18,
Lines 20-21, "a third memory blocking the plurality" should read
--a third memory block in the plurality--.

Column 20,
Lines 29-30, "capacity of/ characters where $1 \leqq 1 \leqq 5$" should read
--capacity of $l$ characters where $1 \leq l \leq 5$--.

Signed and Sealed this
Eighth Day of January, 2013

David J. Kappos
*Director of the United States Patent and Trademark Office*